United States Patent
Cammerata

(10) Patent No.: US 8,094,063 B1
(45) Date of Patent: Jan. 10, 2012

(54) IMAGE FILTERING AND MASKING METHOD AND SYSTEM FOR IMPROVING RESOLUTION OF CLOSELY SPACED OBJECTS IN A RANGE-DOPPLER IMAGE

(75) Inventor: Jeff D. Cammerata, Medford Lakes, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 269 days.

(21) Appl. No.: 12/477,254

(22) Filed: Jun. 3, 2009

(51) Int. Cl.
*G01S 13/89* (2006.01)
(52) U.S. Cl. .................. 342/179; 342/25 R; 382/103
(58) Field of Classification Search .............. 342/179
See application file for complete search history.

(56) References Cited

U.S. PATENT DOCUMENTS

| 5,424,742 A * | 6/1995 | Long et al. .............. 342/25 C |
| 5,430,445 A * | 7/1995 | Peregrim et al. ......... 342/25 C |
| 2011/0002523 A1* | 1/2011 | Prakash et al. ........... 382/131 |

* cited by examiner

*Primary Examiner* — Thomas Tarcza
*Assistant Examiner* — Matthew M Barker
(74) *Attorney, Agent, or Firm* — Howard IP Law Group, PC

(57) ABSTRACT

A method and system for enhancing a radar image provides for application of digital imaging processing techniques to a range-Doppler image produced by a radar system. The application of digital processing techniques includes a 2-D band-pass filter including a smoothing filter followed by a differentiating filter applied to the image. A constraint on concavity is placed upon the resultant 2-D band-pass filtered image to create a mask. The application of this mask to the original image results in an enhanced range-Doppler image with increased resolution.

23 Claims, 5 Drawing Sheets

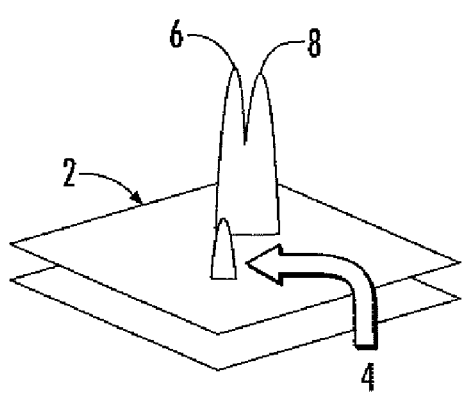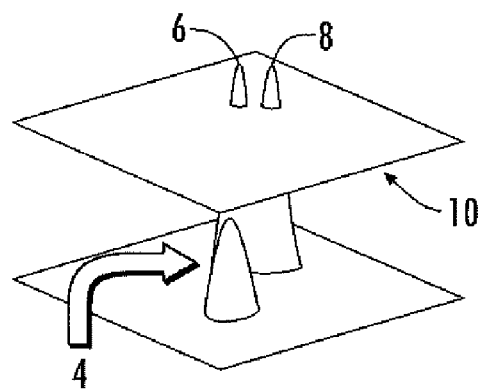
FIG. 1A
(PRIOR ART)
FIG. 1B
(PRIOR ART)

IMAGE FILTERING AND MASKING METHOD AND SYSTEM FOR IMPROVING RESOLUTION OF CLOSELY SPACED OBJECTS IN A RANGE-DOPPLER IMAGE

FIELD OF THE INVENTION

The present invention relates, most generally, to active range determination systems and methods, and more particularly to the enhancement of range-Doppler images by application of 2-D band-pass filters thereto.

BACKGROUND

Radar and other active range determination systems are in widespread use for military, commercial and private purposes. Radar systems have well-known characteristics, in that long-range detection of small objects is known to require transmission of more power, higher gain antennas, and/or more sensitive receivers than that or those required for short-range detection of large objects. Tightly spaced objects, i.e. clusters, of similar size are most difficult to resolve accurately. The resolution of images of closely spaced clusters, particularly those residing off of the ambiguity ridge due to the application of a linear frequency modulated (LFM) waveform, is particularly difficult. LFM pulses are commonly used as radar pulses.

Some conventional range ambiguity resolution techniques require transmission of additional signals with additional dwells for resolving the range interval of the ambiguous object. The additional dwells or transmissions consume additional radar resources, undesirably resulting in a greater overall time required for completion of a surveillance scan.

The generation of range-Doppler images in radar systems has been known and found to be useful for processing continuously collected radar data into an image, but even with range-Doppler images, it remains difficult to resolve the individual scatters associated with closely placed clusters, even for those residing off the ambiguity ridge, due to the application of a LFM pulse that spreads the associated waveform in range and Doppler space.

Range-Doppler and other images typically used in radar are conventionally pre-processed in terms of analog manipulation of the image and such is a limitation, i.e. shortcoming, with respect to how well the radar image can be easily and conveniently manipulated and with respect to the quality of the resolution of multiple clusters, especially closely spaced clusters of similar size. Conventionally, the analog signal amplitude and sensitivity are compromised.

One prior attempt to improve the resolution of closely spaced clusters includes increasing the detection threshold but accompanying this approach is an artificial loss in gain as previous minimal detections fall below the increased threshold level. FIGS. 1A and 1B illustrate this shortcoming of the prior art. In FIG. 1A, detection threshold 2 is comparatively low and small object 4 is detected, i.e. lies above detection threshold 2. Closely spaced objects 6 and 8, however, are unresolved. In FIG. 1B, a higher detection threshold 10 is employed aiding in the resolution of objects 6 and 8. Small object 4, however, is below the detection threshold and is therefore undetected.

It would be desirable to provide a system and method for improving the resolution of closely spaced clusters in radar and other active range determination systems without incurring the limitations and shortcomings of previous attempts.

SUMMARY OF THE INVENTION

To address these and other needs, and in view of its purposes, the present invention provides for the digital manipulation of a range-Doppler image using techniques applicable to the image processing field, and in particular, the application of a band-pass filter to a range-Doppler image produced by radar or other active range determination systems. Signal amplitude and sensitivity are maintained. Such application provides for better resolution of closely spaced clusters and enables the application of conventional clustering algorithms to the enhanced image of increased resolution.

According to one aspect, provided is a method for enhancing the resolution of one or more clusters. The method comprises providing a range-Doppler image of at least one cluster, applying a two-dimensional band-pass filter to the range-Doppler image to produce a modified image, applying a constraint on concavity to the modified image to produce a mask image and applying the mask image to the range-Doppler image to produce a resolved image.

According to another aspect, provided is a method for enhancing resolution of an image. The method comprises providing a radar image detected by a radar detection unit, the radar image representing at least a plurality of clusters, converting the radar image to a digitized radar image, applying a two-dimensional band-pass filter to the digitized radar image to produce a modified image, applying a constraint on concavity to the modified image to produce a mask image, and applying the mask image to the radar image to produce a resolved image.

According to yet another aspect, provided is a system that enhances the resolution of one or more clusters. The system comprises a radar system that provides a range-Doppler image of at least one cluster. The system further includes a processor that applies a two-dimensional band-pass filter to the range-Doppler image to produce a modified image, applies a constraint on concavity to the modified image to produce a mask image and applies the mask image to the range-Doppler image to produce a resolved image.

BRIEF DESCRIPTION OF THE DRAWING

The present invention is best understood from the following detailed description when read in conjunction with the accompanying drawing. It is emphasized that, according to common practice, the various features of the drawing are not necessarily to scale. On the contrary, the dimensions of the various features may be arbitrarily expanded or reduced for clarity. Like numerals denote like features throughout the specification and drawing.

FIGS. 1A and 1B are three-dimensional graphical representations showing the effect of thresholding on cluster separation ability according to the PRIOR ART;

DETAILED DESCRIPTION

Figure 2:
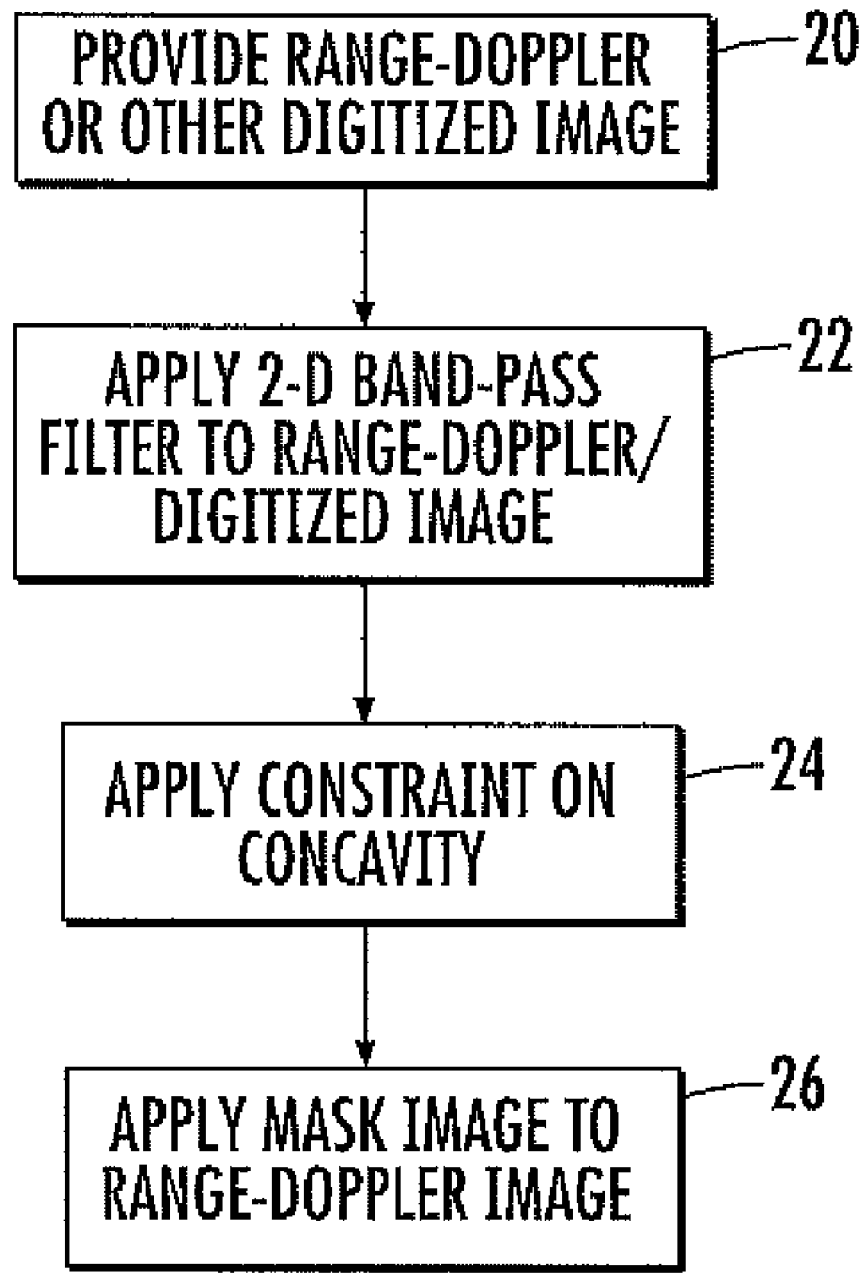
FIG. 2 is a flowchart illustrating an exemplary method of the invention.

Through the application of a two-dimensional, i.e. 2-D, band-pass filter to a range-Doppler image generated by a radar or other active range determination system, the invention provides for cluster boundaries to be more crisply defined, i.e. for closely spaced objects to become more clearly resolved. Signal amplitude and sensitivity are maintained using the method and system provided by the exemplary embodiments of the invention.

There exist a multitude of algorithms specific to the image processing field used to manipulate and enhance digital images. Image processing algorithms are available and utilized in the manufacturing and digital camera industries, for example, for image enhancement. The inventor has discovered that such algorithms can be applied to range-Doppler images in radar applications and in other active range determination systems and that the power weighting of the pixels in range-Doppler images is analogous to the pixel intensity of a common digital photograph. The application of digital image processing techniques to a range-Doppler image advantageously provides for a radar image to be processed and enhanced using digital image processing techniques. The mathematical expression of a range-Doppler image may be mathematically manipulated and represents a digital image of a received radar signal, i.e., the application of an analog-to-digital conversion to a radar image yields a digital range-Doppler image according to known methods. Convolutions to the range-Doppler image may be employed such as the application of high-pass, low-pass, band-pass, or band-stop filters to enhance the quality of the image and/or to reveal certain features within the image. The image masking and edge detection steps of the invention delineate a sequence of applied filters to the original range-Doppler image in order to enhance the object, i.e. cluster, boundaries and subsequent cluster separation ability.

A cluster is an aggregate set of reasonably contiguous pixels and may be alternatively referred to as an object or target. One or more clusters are detected using a conventional radar or other active range determination system and the image of the detected clusters may be a range-Doppler image represented mathematically or displayed graphically using conventional means. Clusters appear as peaks when the image is presented graphically. One aspect of the invention, as illustrated in the figures, is the resolution of the peaks and the valleys between the larger peaks of an image that represent individual clusters. The steps of the inventive method and system employ one or more algorithms that create a clearer boundary between the two peaks, i.e. improve resolution of the image.

The application of one exemplary algorithm to the original range-Doppler image in order to enhance the object boundaries is provided below but it should be understood that such algorithm is exemplary and not limiting of the invention. An overview of an exemplary method and system of the invention are provided in FIGS. 1 and 2.

FIG. 2 is a is a flowchart illustrating an overview of exemplary elements of a method of the invention for enhancing the resolution of one or more clusters. At step 20, the method comprises providing a range-Doppler or other digitized image of at least one cluster, to step 22. Step 20 may include providing a radar image detected by a radar detection unit, the radar image representing at least a plurality of clusters, and converting the radar image to a digitized radar image which may be a range-Doppler image. At step 22, a two-dimensional band-pass filter is applied to the range-Doppler or other digitized image to produce a modified image. At step 24, a constraint on concavity is applied to the modified image to produce a mask image. At step 26, the mask image is applied to the range-Doppler or other digitized image to produce a resolved image. Further details and variations of the aforementioned steps are provided below.

Figure 3:
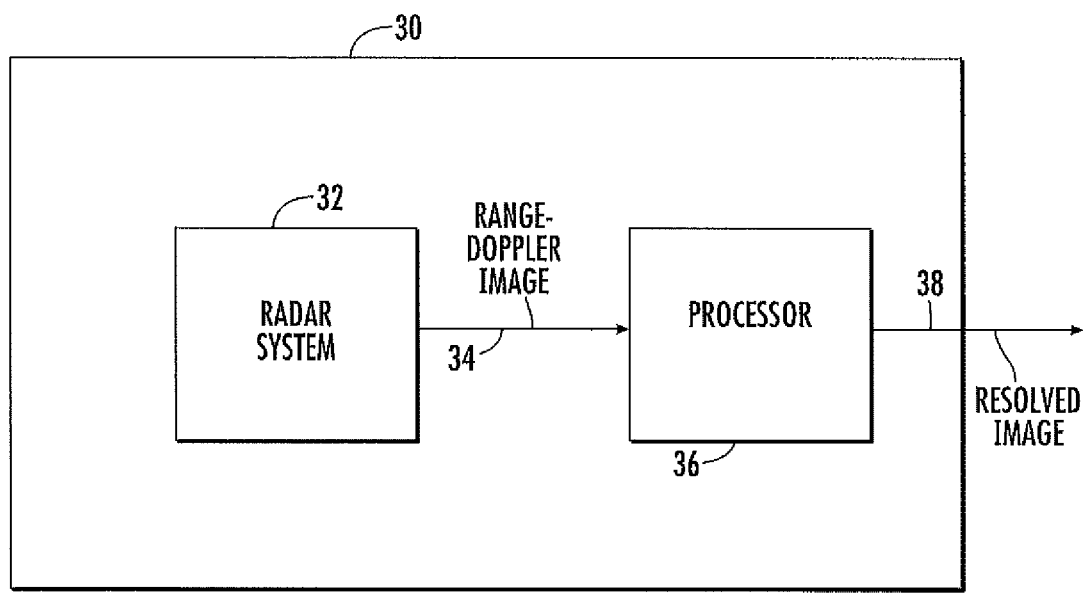
FIG. 3 is a schematic diagram of an exemplary system for carrying out the invention.

FIG. 3 is a schematic diagram of an exemplary system for carrying out the invention. System 30 enhances the resolution of the image of one or more clusters. System 30 comprises a radar system 32 that provides signal 34 of a range-Doppler image of at least one cluster. Radar system 32 may include a processor that converts an initial analog radar signal of at least one cluster to a digital signal that produces a range-Doppler image of at least one cluster. Processor 36 may be a digital image processor that applies a two-dimensional band-pass filter to the range-Doppler image to produce a modified image, applies a constraint on concavity to the modified image to produce a mask image and applies the mask image to the range-Doppler image to produce a resolved image. An optional further processor (not shown) or processor 36 may apply a clustering algorithm to the signal 38 of the resolved image. Further details and variations of the system are provided in the following detailed description.

Figure 4:
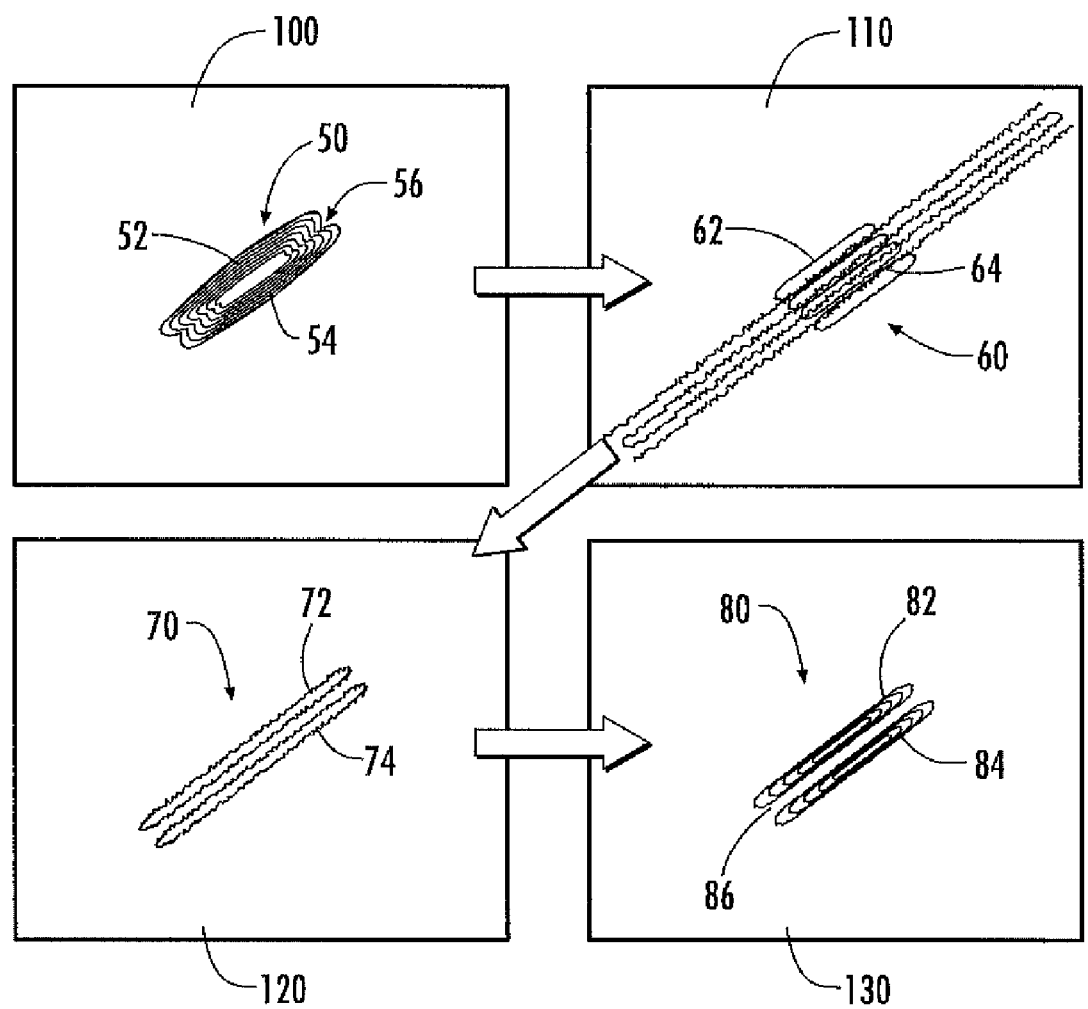
FIG. 4 illustrates a sequence of steps performed on a range-Doppler image to enhance the range-Doppler image and improve resolution of the range-Doppler image according to an exemplary embodiment.

Referring to step 100 of FIG. 4, range-Doppler image 50 includes peaks 52 and 54. Valley 56, which is not very clearly distinguishable, lies between the two peaks 52, 54. Peaks 52, 54 may represent two closely spaced objects of similar size detected using various suitable known radar or other active range determination systems. Known radar techniques for producing the range-Doppler image may include detecting electromagnetic waves reflected by the clusters that are represented by peaks 52, 54. LFM pulses are commonly used radar pulses. Associated LFM waveforms include an up-step LFM waveform and a down-step LFM waveform. Conventional means may be used to produce the range-Doppler radar image using LFM pulses and waveforms.

The two closely spaced objects that are represented by peaks 52 and 54 in FIG. 4, may be two substantially identical objects according to one exemplary embodiment. Various, suitable known methods and techniques may be used to generate range-Doppler image 50, apply a threshold thereto and display or plot the image as illustrated in step 100 of FIG. 4. Various radar systems and conventional processors are known and may be used. The thresholded range-Doppler image 50 shown at step 100 of FIG. 4 may be mathematically represented as I. At step 100, it is difficult to distinguish peaks 52 and 54 as well as valley 56 in range-Doppler image 50 due to ambiguity in the application of the LFM waveform.

Convolving the image I with a 2-D low-pass filter M yields smoothed image S, $$S = I \circ M \qquad \text{(Mathematical Expression 1)}$$

where, $$M = \begin{bmatrix} 1 & 1 & 1 \\ 1 & 1 & 1 \\ 1 & 1 & 1 \end{bmatrix} \cdot \frac{1}{9}. \qquad \text{(Mathematical Expression 2)}$$

The application of the 2-D low-pass filter M to image I smoothes image 50 to mitigate any bias due to spurious or high frequency peaks or valleys in the image. Various other smoothing techniques are available and may be used in other exemplary embodiments. Smoothing creates an approximating function that is directed to capturing important patterns in the data that form the image, while leaving out noise or other fine-scale structures and rapid phenomena. Various other suitable algorithms may be used for smoothing in other exemplary embodiments. One such common smoothing algorithm that may be used is the "moving average". The type of 2-D low-pass smoothing filter M may be varied based upon application. The simplest uniform filter is utilized in the exemplary application. However, other smoothing filters such as triangular, Gaussian, or non-linear smoothing filters may be appropriately and effectively used in other exemplary embodiments.

After the smoothing that produces smoothed image S, a high-pass filter may then be applied wherein:

$$T = S \circ \Delta_{up,down}^{(2)} \quad \text{(Mathematical Expression 3)}$$

where, $$\Delta_{up}^{(2)} = \begin{bmatrix} -1 & 0 & 0 \\ 0 & 2 & 0 \\ 0 & 0 & -1 \end{bmatrix} \quad \text{(Mathematical Expression 4)}$$

is a matrix that defines regions of concavity perpendicular to the ambiguity slope. T is a matrix representing the smoothed image after having applied thereto a digital bandpass filter in which the bandpass filter consists of a 2-D low-pass filter, M, and a high-pass filter in sequence. The $\Delta_{up}^{(2)}$, is a high pass filter and the 'up' denotes a 2-D second ($2^{nd}$) order differentiating matrix that is advantageously applied to images resulting from an up-step LFM waveform of the range-Doppler image. Applied to the thresholded, smoothed, image resulting from the corresponding down-step LFM waveform of the range-Doppler image is exemplary matrix $\Delta_{down}^{(2)}$, expressed as follows:

$$\Delta_{down}^{(2)} = \begin{bmatrix} 0 & 0 & -1 \\ 0 & 2 & 0 \\ -1 & 0 & 0 \end{bmatrix} \quad \text{(Mathematical Expression 5)}$$

The $\Delta_{down}^{(2)}$ is a high pass filter that is also a 2-D $2^{nd}$ order differentiating matrix. Combining the low-pass filter M and the high-pass filter $\Delta_{up}^{(2)}$ in the case of an up-step LFM waveform yields a single band-pass filter BP. Expressing T again, $$T = I \circ BP = S \circ \Delta_{up,down}^{(2)} \quad \text{(Mathematical Expression 6)}$$

in which $$BP = M \circ \Delta_{up}^{(2)} = \begin{bmatrix} 0 & 0 & -1 & -1 & -1 \\ 0 & 2 & 1 & 1 & -1 \\ -1 & 1 & 0 & 1 & -1 \\ -1 & 1 & 1 & 2 & 0 \\ -1 & -1 & -1 & 0 & 0 \end{bmatrix} \cdot \frac{1}{9}. \quad \text{(Mathematical Expression 7)}$$

The application of the band-pass filter, BP, to image 50 (I) of step 100 of FIG. 4, produces T, illustrated as image 60 with peaks 62 and 64 at step 110 of FIG. 4. Exemplary band-pass filter BP is applied to the target response associated with an up-step LFM waveform. According to the embodiment in which the LFM waveform is a down-step LFM waveform, the 2-D $2^{nd}$ differentiating matrix $\Delta_{down}^{(2)}$ would be applied.

A filter with concavity constraints is then applied to image 60 to produce a mask. Mask 70 shown in step 120 of FIG. 4 is produced by placing a constraint on the concavity of the signal representing image 60 and that may be expressed by Mask=T>0, i.e. when T>0, Mask takes on a value of "1" and when T≦0, Mask takes on a value of "0". Constraining the concavity in this way identifies the topological peaks in intensity of the image. The value of the constraint may be varied based upon a desire to tune the sharp or shallow peaks in the intensity. The T>0 constraint includes all peaks both shallow and sharp while eliminating all valleys.

The type of second derivative concavity generating filter may be varied based upon application. In the illustrated exemplary embodiment, a basic second order derivative filter having a preferential diagonal direction across the image was chosen for this application to advantageously identify peaks perpendicular to the ambiguity ridge. Other second order filters such as Laplacian or Gaussian second order derivative filters may be appropriately and effective used in other exemplary embodiments.

Mask 70 includes more clearly resolved peaks 72, 74. Step 130 of FIG. 4 represents the mapping of Mask onto the original range-Doppler image 50 such that the new image is mathematically represented by:

$$I_{new} = \text{Mask} \bullet I \quad \text{(Mathematical Expression 8)}$$

Where • denotes the matrix dot product operation and the new image, $I_{new}$, is shown as image 80 at step 130 of FIG. 4. Image 80 is an image of higher resolution than original range-Doppler image 50 and includes more crisply defined peaks 82 and 84 with valley 86 clearly distinguished between peaks 82 and 84. Steps 100 through 130 illustrate the effects of the application of filters on a thresholded range-Doppler image produced by a simulated symmetrical dumbbell object.

Figure 5:
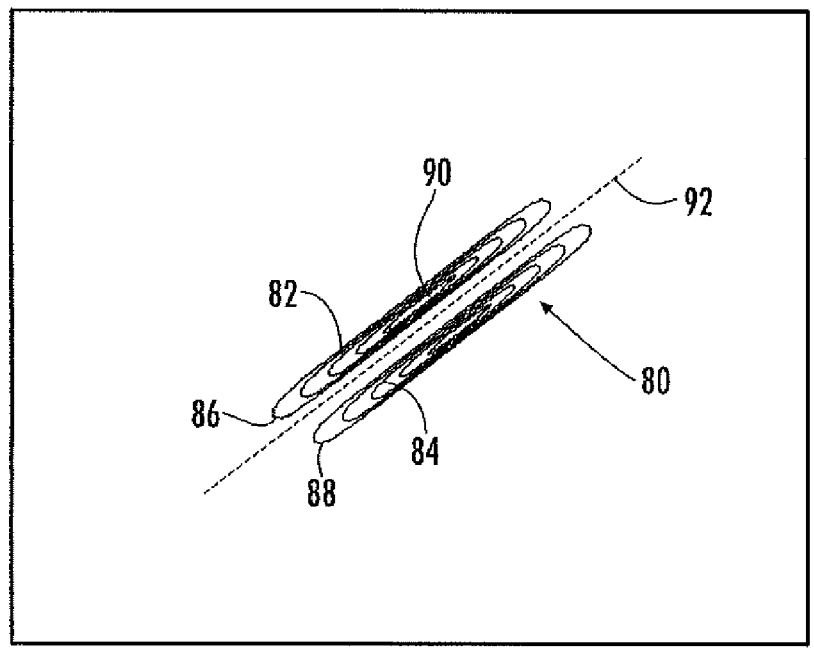
FIG. 5 is an illustration of an image shown in FIG. 4, in greater detail.

Resolved image 80 is shown in more detail in FIG. 5. There exists a clear boundary, indicated by dashed line 92 along valley 86, between peaks 82 and 84. The two images detected by the radar or other active range determination system, are now more clearly distinguished and signal amplitude and sensitivity are maintained. Such an advantage finds application in resolving any of various types of similar or distinct objects and any number of the same that may be at various degrees of proximity. The resolved image may be displayed using various conventional display means. Various suitable and conventional digital image or other processors may be used to carry out the described mathematical manipulations. Various data processing means may be used to further apply a clustering algorithm to the resolved image.

Figure 6:
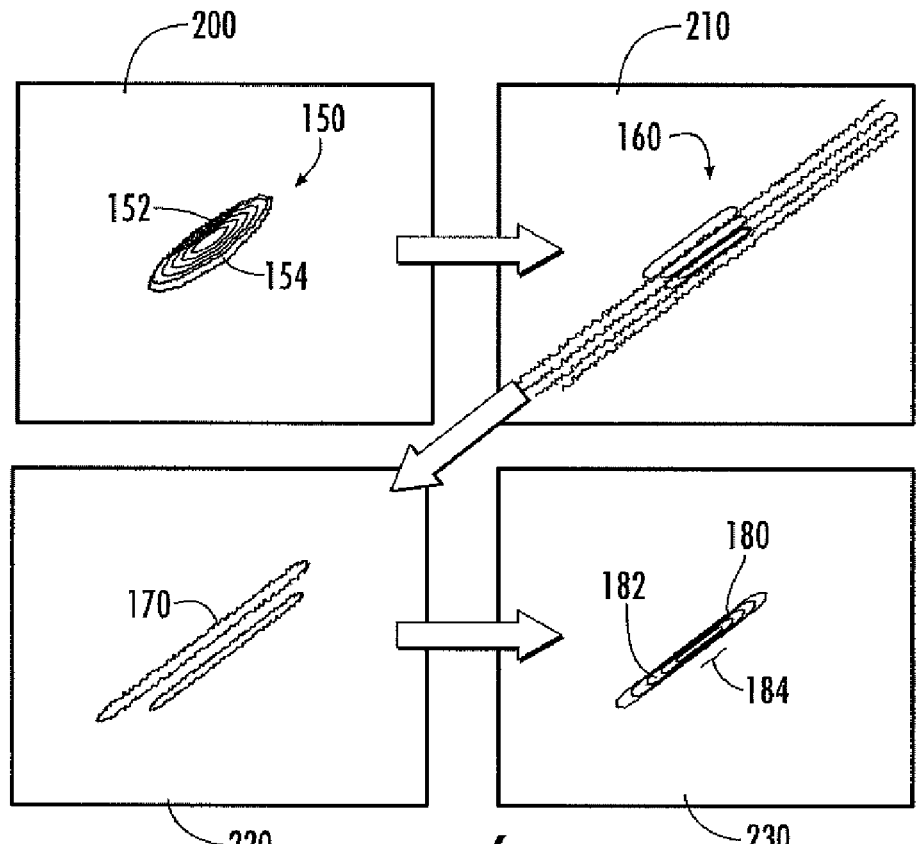
FIG. 6 illustrates a sequence of steps performed on another exemplary embodiment of a range-Doppler image to enhance the range-Doppler image and improve resolution of the range-Doppler image.

FIG. 6 illustrates another exemplary embodiment of the present invention. Steps 200, 210, 220 and 230 of FIG. 6 are similar to corresponding steps 100, 110, 120 and 130 of FIG. 4 and illustrate the application of the techniques of the invention to an asymmetric dumbbell target, i.e., two closely spaced objects of different size. Dominant end 152 of image 150 represents a larger object and is about an order of magnitude higher than low end 154 of image 150 which represents a smaller object and resides just above the detection threshold. Image 150 may be a thresholded range-Doppler image as described above. The techniques of the invention as described above in conjunction with FIG. 4, when applied to range-Doppler image 150 of step 200 of FIG. 6, sequentially produce image 160, image 170 and resolved image 180 with more crisply defined peaks 182 and 184. In particular, image 150 of step 200 of FIG. 6 may be mathematically manipulated to produce image 160 of step 210 of FIG. 6 in the same manner that image 50 of step 100 of FIG. 4, was mathematically manipulated to produce image 60 of step 110 of FIG. 4, and so forth.

The algorithm, matrices and band-pass filter, BP, are intended to be exemplary only and various other suitable algorithms applicable to the image processing field such as employ 2-D convolutions to the image such as high pass, low-pass, band-pass, or band-stop filters, may be used in conjunction with concavity constraint or other filters to enhance the resolution of the original range-Doppler image. The image so resolved may represent any number of objects at various degrees of proximity.

Also provided is a system for carrying out the described methods. A radar system including a radar image processing system is provided and includes a receiver that receives a radar image of at least one cluster and the image may be a range-Doppler image to which a threshold may be applied. Various conventional receivers used in the radar and other active range determination fields are available and may be suitable for use. Various conventional processors may be used as data processing means to produce a range-Doppler image of the radar image. Various conventional display devices may be used to display the received image which may be a range-Doppler image. Also provided is a processor. Various suitable digital image processors or other processors may be used. The digital image processor applies a filter such as a 2-D band-pass filter to the range-Doppler image to produce a modified image, applies a constraint on concavity to the modified image to produce a mask image, and applies the mask image to the range-Doppler image to produce a resolved image, as described above. The resolved image may be displayed using various conventional display means. Various data processing means may be used to further apply a clustering algorithm to the resolved image. The clustering algorithm may be applied by the same processor used to apply the aforementioned filters, or using a further processor.

The invention also provides a computer readable medium with instructions for sequentially performing the above-described mathematical manipulations.

The preceding merely illustrates the principles of the exemplary embodiments. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles and aspects of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not necessarily require that the apparatus be constructed or operated in a particular orientation.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for enhancing resolution of an image, said method comprising:
   providing a range-Doppler image of at least one cluster;
   applying a two-dimensional (2-D) band-pass filter to said range-Doppler image to produce a modified image;
   applying a constraint on concavity to said modified image to produce a mask image; and
   applying said mask image to said range-Doppler image to produce a resolved image,
   wherein said applying 2-D band-pass filter comprises applying a smoothing filter and applying a differentiating filter.

2. The method as in claim 1, wherein said range-Doppler image is a radar image produced by a radar system.

3. The method as in claim 1, wherein said providing a range-Doppler image of at least one cluster includes detecting electromagnetic waves reflected by a plurality of clusters.

4. The method as in claim 1, wherein said applying a 2-D band-pass filter comprises applying a sequence of individual filters to said range-Doppler image.

5. The method as in claim 1, wherein said at least one cluster comprises a plurality of clusters.

6. The method of claim 1, wherein said applying 2-D band-pass filter comprises applying said smoothing filter then applying said differentiating filter.

7. The method as in claim 1, wherein said range-Doppler image is a thresholded range-Doppler image.

8. The method as in claim 1, further comprising applying a clustering algorithm to said resolved image.

9. The method as in claim 1, wherein said resolved image comprises a duality of two identical objects.

10. A method for enhancing resolution of a radar image, said method comprising:
    providing a radar image detected by a radar detection unit, said radar image representing at least a plurality of clusters;
    converting said radar image to a digitized radar image;
    applying a two-dimensional (2-D) band-pass filter to said digitized radar image to produce a modified image;
    applying a constraint on concavity to said modified image to produce a mask image; and
    applying said mask image to said radar image to produce a resolved image,
    wherein said applying a 2-D band-pass filter comprises applying a smoothing filter and applying a differentiating filter.

11. The method as in claim 10, wherein said converting comprises performing an analog-to-digital conversion.

12. The method as in claim 10, wherein said digitized radar image comprises a range-Doppler image.

13. The method as in claim 10, wherein said applying a 2-D band-pass filter comprises applying a low-pass filter and applying a high-pass filter.

14. The method as in claim 10, further comprising applying a clustering algorithm to said resolved image.

15. A system for enhancing resolution of a radar image, said system comprising:
    a radar system that provides a range-Doppler image of at least one cluster; and
    a digital image processor that applies a 2-D band-pass filter comprising a smoothing filter and a differentiating filter to said range-Doppler image to produce a modified image, applies a constraint on concavity to said modified image to produce a mask image and applies said mask image to said range-Doppler image to produce a resolved image.

16. The system as in claim 15, further comprising one of a further processor and said digital image processor applying a clustering algorithm to said resolved image.

17. The system as in claim 15, wherein said 2-D band-pass filter smoothes said range-Doppler image.

18. The system as in claim 15, wherein said 2-D band-pass filter comprises a low-pass filter and a high-pass filter.

19. The system as in claim 15, wherein said radar system includes a processor that converts an initial analog radar signal of said at least one cluster to a digital signal that produces said range-Doppler image of said at least one cluster.

20. A method for enhancing resolution of an image, said method comprising:
providing a range-Doppler image of at least one cluster;
applying a two-dimensional (2-D) band-pass filter to said range-Doppler image to produce a modified image;
applying a constraint on concavity to said modified image to produce a mask image; and
applying said mask image to said range-Doppler image to produce a resolved image,
wherein said providing a range-Doppler image comprises application of a linear frequency modulated (LFM) waveform including an up-step LFM waveform or a down-step LFM waveform and said applying a 2-D band-pass filter comprises applying a low pass filter and applying a high pass filter, wherein said high pass filter comprises a $2^{nd}$ order differentiating filter.

21. A method for enhancing resolution of an image, said method comprising:
providing a range-Doppler image of at least one cluster;
applying a two-dimensional (2-D) band-pass filter to said range-Doppler image to produce a modified image;
applying a constraint on concavity to said modified image to produce a mask image; and
applying said mask image to said range-Doppler image to produce a resolved image,
wherein said applying a 2-D band-pass filter comprises applying a 2-D matrix representing said 2-D band-pass filter to a mathematical representation of said range-Doppler image.

22. The method as in claim 21, wherein said 2-D band-pass filter, BP, is mathematically expressed as $$BP = \begin{bmatrix} 0 & 0 & -1 & -1 & -1 \\ 0 & 2 & 1 & 1 & -1 \\ -1 & 1 & 0 & 1 & -1 \\ -1 & 1 & 1 & 2 & 0 \\ -1 & -1 & -1 & 0 & 0 \end{bmatrix} \cdot \frac{1}{9}.$$

23. A system for enhancing resolution of a radar image, said system comprising:
a radar system that provides a range-Doppler image of at least one cluster; and
a digital image processor that applies a 2-D band-pass filter to said range-Doppler image to produce a modified image, applies a constraint on concavity to said modified image to produce a mask image and applies said mask image to said range-Doppler image to produce a resolved image,
wherein said range-Doppler image includes an up-step linear frequency modulated (LFM) waveform or a down-step LFM waveform and said 2-D band-pass filter comprises at least a second order differentiating matrix.

* * * * *